Patented Nov. 24, 1942

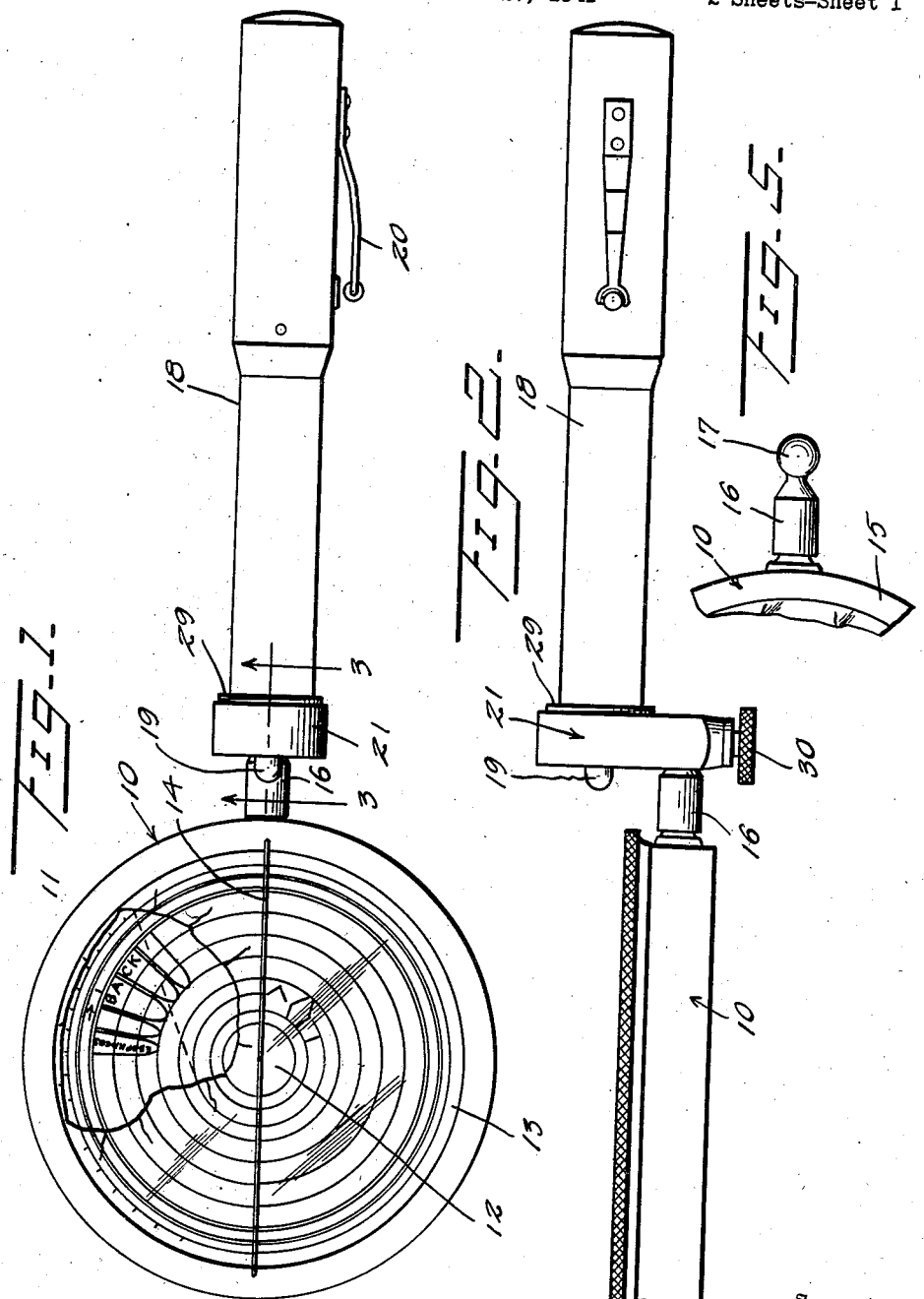

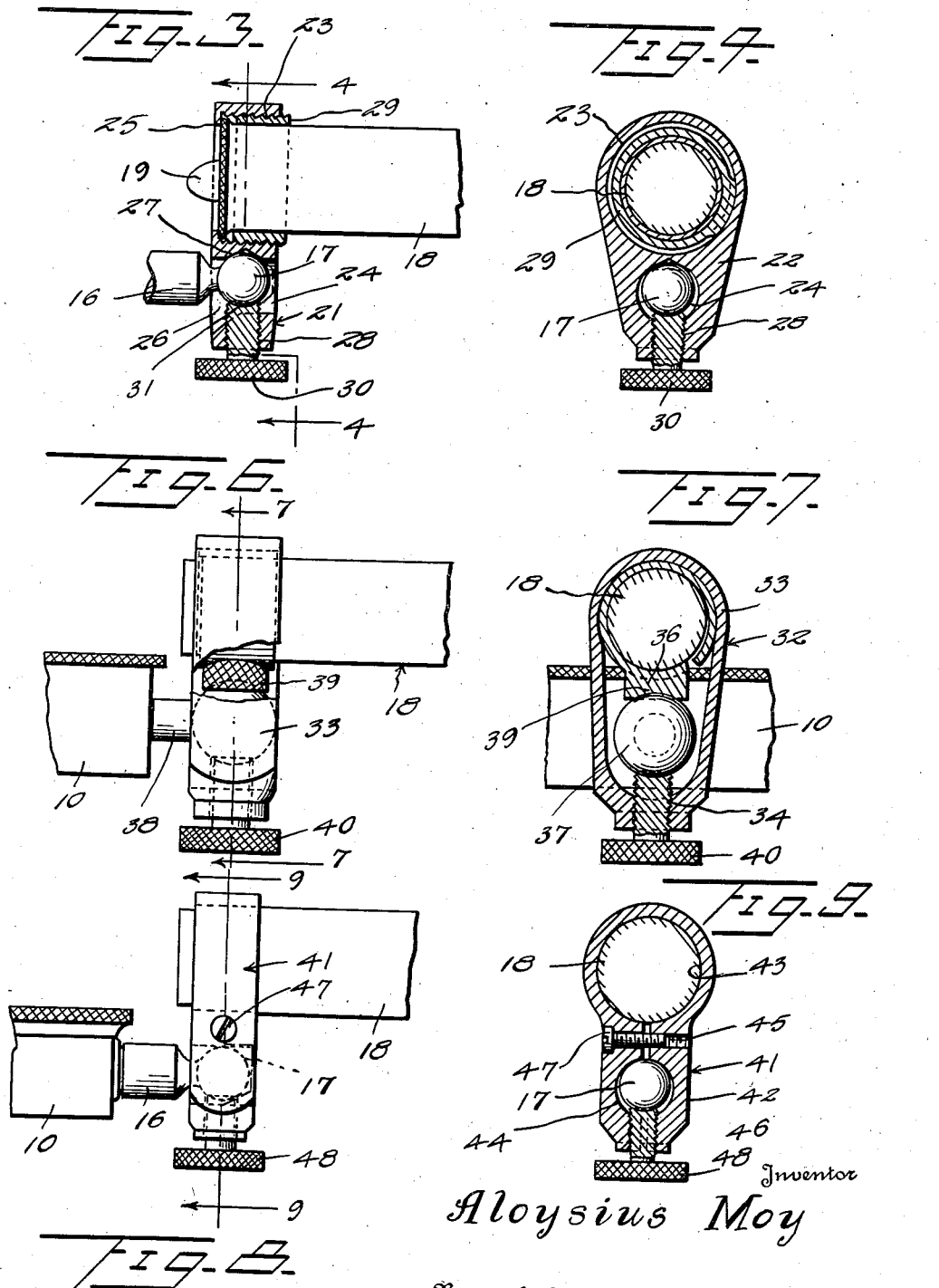

2,303,221

UNITED STATES PATENT OFFICE 2,303,221

IRISCOPE

Aloysius Moy, Boston, Mass.

Application January 27, 1941, Serial No. 376,230

3 Claims. (Cl. 88—20)

This invention relates to an iriscope, but more particularly to means for projecting the rays from a flash-light between the iris and iridiagnosis chart forming an element of the iriscope.

The invention aims in the provision of means whereby light rays from a flash-light will be directed between the iris and the iridiagnosis chart to thereby greatly facilitate an examination of the iris.

The invention further aims in the provision of a means offset with respect to the holder for the chart aforesaid and with said offset means having a controllable flash-light so located whereby when the examination of the iris is being carried on, the light rays from the flash-light will be projected between the chart and the iris for illuminating the latter which greatly facilitates the examination.

The invention further resides in the provision of a holder for the chart aforesaid, a combined handle and flash-light battery element and means for offsetting the holder with respect to said element.

The invention further resides in the provision of directing light rays between a holder for an iridiagnosis chart and the iris when the latter is being examined.

The invention further aims to provide, in a manner as hereinafter set forth, an iriscope which is simple in its construction and arrangement, strong, durable, thoroughly efficient in its use, conveniently controlled, readily assembled and comparatively inexpensive to manufacture.

Embodying the aims aforesaid and others which may hereinafter appear, the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a rear elevation of an iriscope in accordance with this invention,

Figure 2 is an edge view thereof,

Figure 3 is a section on line 3—3 Figure 1,

Figure 4 is a view on line 4—4 Figure 3,

Figure 5 is a fragmentary view in side elevation of the chart holder,

Figure 6 is a fragmentary view broken away of a modified form,

Figure 7 is a view on line 7—7 Figure 6,

Figure 8 is a fragmentary view in said elevation of still another modified form, and Figure 9 is a section on line 9—9 Figure 8.

With reference to the drawings, 10 indicates an annular holder for a pair of iridiagnosis charts 11, only one shown. These charts have axial openings 12. The charts are visible from the back and front of the holder and as it is well known the latter is provided with a pair of lenses 13, only one shown, and one is arranged at the front and the other at the back of the holder. The back of the holder is formed with a wire 14 disposed diametrically thereof. The foregoing arrangement is of known form.

The body 15 of the holder 10 has formed integral therewith a radially disposed arm 16 having a globular outer end 17. The arm 16 has its inner end integral with the outer periphery of the holder 10.

The structure heretofore referred to will apply to any one of the forms of the iriscope as shown. With reference to Figures 1 to 4, the device includes a combined handle and flash-light battery element 18 provided at one end with a flash-light 19. The element 18 is provided with circuit opening and closing means 20 for the light 19.

There is correlated with the element 18 a coupling structure 21 for the purpose of connecting the element 18 to the holder 10 and to disposed element 18 offset with respect to said holder. The structure 21 consists of a coupling member 22 which decreases in width from one end to the other and is formed in its larger end portion with a threaded opening 23 and in its narrow portion with an opening 24. The wall of opening 23 at one end thereof is provided with an inwardly extending annular flange 25. One end of the opening 24 is enlarged, as at 26. The wall of the opening 24 intermediate its ends has a concave groove 27. The smaller end of the member 22 has a threaded opening 28 which communicates with the opening 24.

The element 18 is extended into the opening 23 and abuts the flange 25 and has the flash-light 19 projected from the member 22. The element 18 is secured to the member 22 by a peripherally threaded clamping sleeve 29 which encompasses element 18 and has threaded engagement with the wall of the opening 23, whereby element 18 is secured to the structure 21. The globular end 17 of the arm 16 is positioned in the opening 24 and is seated in the groove 27. The arm 16 is detachably clamped in the structure 21 by a binding screw 30 which engages with the threads of the opening 28 and abuts against the globular end 17 of the arm 16, whereby the holder 10 is secured to the structure 21 and is disposed in offset relation with respect to the element 18. The inner end of the screw 30 is of curved contour, as indicated at 31.

The modified form shown by Figures 6 and 7 will be the same as the form shown by Figure 1 with this exception that the coupling structure between the holder 10 and the element 18 is of a different form. The coupling structure shown in Figures 6 and 7 is generally indicated at 32 and it includes a substantially oval-shaped link 33 decreasing in width from one end to the other. The smaller end of the link 33 is provided with a threaded opening 34. Arranged in the larger end of the link 33 is a split annular clamp 35 formed with an abutment 36. The element 18 is adapted to extend through the split clamp 35 and the spherical outer end 37 of the arm 38 on the carrier 10 is adapted to seat in the abutment 36. The latter is formed with a seat 39 for a portion of said end 37. Threadedly engaging with and extending through the opening 34 is a clamping screw 40, which binds against the end 37 which in turn binds against the abutment 36 and this will provide for the clamp 35 to tightly engage the element 18 whereby the latter is connected to the structure 32, as well as the arm 38. The globular end 37 of the arm 38 is of a greater diameter than the end 17 of the arm 16. When the element 18 and arm 38 are clamped to the link 33 the holder will be disposed in offset relation with respect to the element 18.

With respect to the modified form shown by Figures 8 and 9, it is the same as the form shown by Figure 1 with this exception that the structure employed for coupling the element 18 to the holder 10 is different from the structure 21. In Figures 8 and 9 the coupling structure employed for connecting the element 18 with the element 10 is generally indicated at 41 and it is in the form of a split clamp 42 formed with a pair of spaced openings 43, 44. The opening 43 is of greater diameter than the opening 44. The clamp 42 has a transversely disposed split threaded opening 45 and a longitudinally extending split threaded opening 46. The element 18 is adapted to be extended in the opening 43, as is shown in Figure 8. After being so positioned the screw 47, which operates in the opening 45, acts to shift the sections of the clamp together whereby the latter will tightly bind against the element 18. The globular end 17 of the arm 16 of the holder 10 is adapted to be mounted in the opening 44. There is correlated with the opening 46 a clamping screw 48 which engages the end 17 of arm 16 and binds said end in the clamp. The construction provides for coupling the element 18 with the holder 10, but with the latter in offset relation with respect to the element 18.

The coupling structures employed for offsetting the element 18 relative to the holder 10 are disposed at right angles to the element 18.

The manner of setting up the element 18 relative to the holder 10 will provide, when the device is used, for the light rays from the flash-light being projected between the holder 10 and the iris.

Owing to the manner in which the holder 10 is coupled with the element 18 the said holder may be disposed at various angles, if desired, with respect to the coupling structure, after which it is fixed in desired angular position. The element 18 is removably connected to the coupling structure to permit of its disconnection when occasion requires.

It is to be understood that in lieu of the back of the holder 10 being formed with the wire 14 for correlation with a lens, the latter may be provided diametrically thereof with a line formed by etching or otherwise. As to the charts 11, the carrier or support for one is screwed on the holder, while the other one is flushed on.

What I claim is:

1. In an iriscope of the type having an inspection lens, an indicia holder circumscribing said lens, an indicia chart mounted on said holder and an illuminator for illuminating said indicia chart; an adjustable connector for said illuminator and said holder comprising a body having an enlarged portion adjacent one end thereof, said enlarged portion having an opening extending transversely therethrough, the other end of said body having an opening extending transversely therethrough, means for securing said illuminator in the enlarged portion opening of said body at right angles to said body, an arm secured at one end to said holder, a ball member secured to the outer end of said arm, means adjustably securing said ball member in the second-named opening in said body with said arm extending from said body oppositely from said illuminator in a general parallel relation thereto.

2. In an iriscope, in combination, an iridiagnostic device, a combined illuminator for said iridiagnostic device and handle, and an adjustable connector adapted to secure said combined illuminator and handle and said iridiagnostic device together, said connector comprising a body member having a large transverse threaded bore through its larger end and a smaller transverse bore through its smaller end, said second-named bore having an enlarged socket forming portion centrally thereof, said body also having a threaded bore extending at right angles to said first-named bores and intersecting the smaller of said first named bores centrally thereof, an externally threaded sleeve positioned in said large bore, a set screw positioned in said right angularly extending threaded bore, a shaft secured at one end to said iridiagnostic device and having a ball-like outer end, said ball-like end being secured in said small transverse bore by said set screw, said illuminator being secured in said large transverse threaded bore by said sleeve, said shaft and said illuminator being positioned in substantially parallel offset relation.

3. In an iriscope of the type having an inspection lens, an indicia holder circumscribing said lens, an indicia chart mounted on said holder, and an illuminator for illuminating said indicia chart; an adjustable connector for said illuminator and said holder comprising a body having an enlarged portion adjacent one end thereof and a reduced portion adjacent the opposite end thereof, said enlarged end having a transverse bore extending therethrough, and said reduced end having a transverse bore extending therethrough, said reduced end having a second bore extending from said reduced end portion outwardly through the end of said body at right angles to said reduced end bore, said right angularly disposed bore being screw-threaded, an arm secured at one end to said holder, a ball secured to the opposite end of said arm, said ball being positioned in said reduced end bore, and a set screw positioned in said screw-threaded bore and adapted to secure said ball in said reduced end bore, said illuminator being secured in said enlarged end bore and extending therefrom oppositely and substantially parallel to said arm.

ALOYSIUS MOY.